E. J. BRADY.
DRAFT EVENER.
APPLICATION FILED JAN. 16, 1915.
1,162,021.    Patented Nov. 30, 1915.
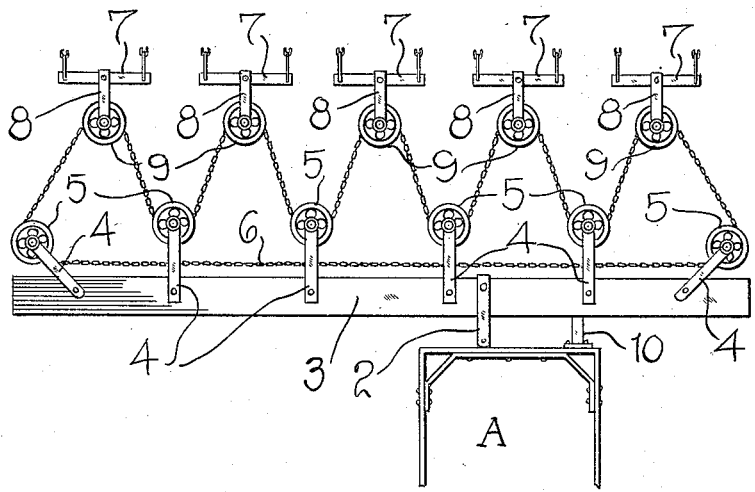
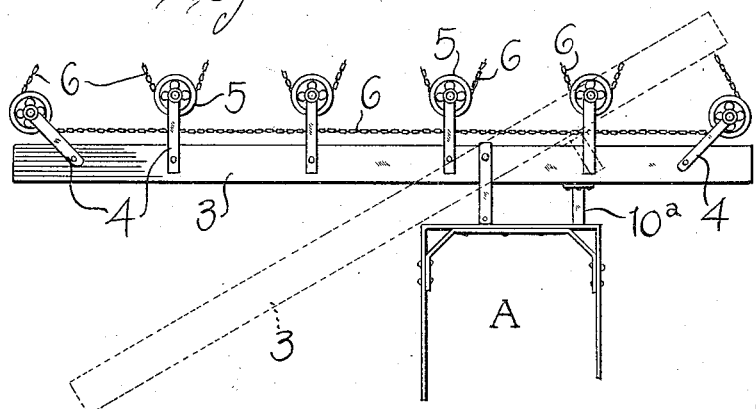
Inventor
EDWARD J. BRADY
Witnesses
Robert M. Sutphen
A. L. Huff
By Watson E. Coleman
Attorney

UNITED STATES PATENT OFFICE.

EDWARD J. BRADY, OF MENDOTA, ILLINOIS.

DRAFT-EVENER.

1,162,021.  Specification of Letters Patent.  Patented Nov. 30, 1915.

Application filed January 16, 1915. Serial No. 2,666.

*To all whom it may concern:*

Be it known that I, EDWARD J. BRADY, a citizen of the United States, residing at Mendota, in the county of La Salle and State of Illinois, have invented certain new and useful Improvements in Draft-Eveners, of which the following is a specification, reference being had to the accompanying drawings.

My invention relates to draft eveners, and particularly to that class of draft eveners wherein a plurality of pulleys are attached to the evener bar or double-tree and wherein a draft chain is used, passing over the pulleys, and to which a plurality of horses or draft animals are hitched.

The object of my invention is to improve upon the construction of this class of devices, particularly by so constructing the draft evener that a plurality of horses may be attached thereto and the draft evener connected to the machine to be drawn at a point not equidistant between the ends of the evener bar.

In plowing with a gang plow five horses are ordinarily used, and it is of course necessary that the horses shall be so hitched to the plow that the horse on the end of the evener shall not walk over the plowed ground. As a consequence it is necessary to hitch the evener bar to the plow at a point to one side of its middle. This is also the case where five horses are used for drawing a binder or like mechanism. Here again the end horse should not walk over the standing grain, and hence the evener bar must be hitched to the binder at a point not equidistant between its ends.

It is the further object of my invention therefore to provide a draft evener to be used for five or more horses, this evener being so arranged that though the evener bar be pivotally connected to the machine at a point not equidistant between these ends, yet the draft on said bar shall be even and the double-tree or evener bar shall be stationary when the team is pulled straight ahead, the draft being equal at all points of the bar, the arrangement, however, not preventing the team from turning.

A further object of the invention is to so connect the team to the evener bar that every horse or draft animal exerts an equal pull upon the bar and upon the machine.

Other objects will appear in the course of the following description.

My invention is illustrated in the accompanying drawings, wherein—

Figure 1 is a plan view of my draft evener showing it at "stationary" position; Fig. 2 is a like view to Fig. 1, but showing the stop mounted upon the evener bar, and also showing in dotted line the turning position of the evener bar.

Referring to these drawings, A designates a machine of any suitable character, such as a gang plow. This machine has the usual clevis 2 projecting out from its forward end, and pivoted to this clevis in any suitable manner in the evener bar 3. This bar may be of any suitable construction. Attached to the bar are a plurality of clips or brackets 4, also of any suitable construction and carrying pulleys 5. For a five-horse team there will be six clips and six pulleys. These clips and pulleys are mounted equidistantly upon the bar, there being a pulley at each end of the bar. Passing behind these pulleys is an endless flexible connection such as a chain 6. This chain passes behind all the pulleys and around the end pulleys, then passes again back of the intermediate pulleys. As illustrated in the drawings, there are five swingle-trees, designated 7, also of any usual construction, the clevises 8 of which support the pulleys 9. These pulleys are disposed in advance of but between the several pulleys 5, and over these pulleys 9 the flexible connection passes, as clearly shown in Fig. 1.

Preferably projecting from the frame of the machine being drawn, and illustrated as projecting from the forward end of the gang plow A, is a stop 10 which projects from the frame a sufficient distance so that the evener bar will be disposed at right angles to the line of draft of the machine when the short end of the evener bar bears against the stop. While I have illustrated in Fig. 1 the stop as being applied to the machine, it of course might be applied to the evener bar itself, as illustrated in Fig. 2. The clevis 2 is pivoted to the evener bar, not at its middle but to one side of its middle, and preferably so that there are two horses disposed opposite the short end of the evener bar and three horses disposed opposite the long end of the evener bar.

With the construction heretofore described, the draft of the five horses on the evener bar will be evenly distributed and no horse will pull more than any other horse. The load on any one horse will exactly equal the load on any other horse, no matter whether one horse gets slightly in advance of the other or not, and no matter whether the horse is pulling at an angle or straight ahead. The pull of the three horses on one side of the pivotal point of the evener bar will more than balance the pull of the two horses on the opposite side of the evener bar, and as a consequence the evener bar will be brought against the stop 10, as shown clearly in Fig. 1. Thus the evener bar will be stationary when the team is pulling, though the draft upon the horses will be equal, as before explained. Inasmuch as the draft upon the longer side of the evener bar will be greater than the draft upon the short side of the evener bar, the evener bar will remain stationary at all times while the team is pulling except when turning around, and in turning around the evener bar will take the position shown in dotted lines in Fig. 2.

I have tested my evener in practice and find by careful experiment that under all circumstances each horse has to pull exactly the same as any other horse, and that when one horse pulls ahead, even when the evener bar is hitched at its middle to the machine, one end of the evener bar will not be pulled ahead of the other, but merely a certain amount of chain will be taken up by the horse who is ahead without changing, however, the amount of pull.

It is particularly desired to call attention to the fact that my device is an endless chain equalizer, that is, the chain 6 is endless. Where the chain is not endless and does not pass over pulleys attached to the clevises of the swingle-trees, then if two of the horses pulled ahead they would draw upon the pulley between them, the pulley attached to the double-tree, and as a consequence they would draw the whole machine instead of the chain running loosely and freely through the pulleys on the swingle-tree. It is further to be noted that my chain is entirely free to be moved longitudinally, and it is also to be noted that my invention is applicable to the hitching of a less number of horses than five, or a greater number.

Having described my invention, what I claim is:

1. A draft evener comprising an evener bar pivotally supported intermediate of its ends, a plurality of pulleys mounted upon and forward of the front face of the bar, an endless flexible member having a rear stretch disposed behind all of the pulleys and extending around the end pulleys, the forward stretch of said endless member extending behind the intermediate pulleys, and a plurality of draft pulleys disposed each between two of the first named pulleys and forward of the same and over which the forward stretch of said member passes.

2. A draft evener comprising an evener bar pivotally supported intermediate its ends, the pivotal axis of said bar being disposed nearer to one end of the bar than to the other, a plurality of pulleys mounted upon the bar and disposed in advance of the front face thereof, an endless flexible member having a rear stretch disposed behind all of the pulleys and extending around the end pulleys, and then extending behind the intermediate pulleys, and a plurality of draft pulleys adapted to be connected each to a draft animal and disposed between each two pulleys of the evener bar and in advance thereof, said flexible member passing around said draft pulleys.

3. The combination with a machine to be drawn, of an evener bar pivotally connected to the machine at a point to one side of the middle of the bar, a stop adapted to limit the movement of the short end of the bar toward the machine but permit the rearward movement of the long end of the evener bar, a plurality of pulleys on the front face of the evener bar, an endless flexible member having a rear stretch disposed behind all of the pulleys and extending around the end pulleys, and extending behind the intermediate pulleys of the bar, and a plurality of draft pulleys each adapted to be connected to a draft animal, said draft pulleys being disposed in line between each pair of the first named pulleys but in advance thereof, the flexible member passing around said draft pulleys.

4. The combination with a machine, of an evener bar pivoted to the forward end of the machine, the pivotal point of the bar being nearer one end than the other, a stop mounted on the machine and extending toward the short end of the bar and limiting the rearward movement of the short end of the bar, a plurality of pulleys attached equidistantly along the bar, a flexible member passing behind all of said pulleys and around the end pulleys and then behind the intermediate pulleys, a plurality of swingle-trees, and a pulley attached to the middle of each swingle-tree and around which said flexible member passes, the second named pulleys being disposed in advance of or in line between each pair of the first named pulleys.

5. A draft evener of the character described comprising an evener bar for a five-horse team having six pulleys supported upon it in advance of its front face, said pulleys being equidistant, a clevis engaging the evener bar at a point approximately two-fifths of its length from one end, five draft pulleys, each adapted to be connected to a single horse and disposed in advance of the evener bar, and a flexible connection extending along the front face of the evener bar and behind all of said pulleys, then extending around the end pulleys and alternately around the several draft pulleys and the intermediate pulleys of the bar.

In testimony whereof I hereunto affix my signature in the presence of two witnesses.

EDWARD J. BRADY.

Witnesses:
THOMAS F. MURPHY,
CHAS. WILKINS.

Copies of this patent may be obtained for five cents each, by addressing the "Commissioner of Patents, Washington, D. C."